United States Patent [19]

Matsumoto

[11] Patent Number: 5,790,556
[45] Date of Patent: Aug. 4, 1998

[54] METHOD AND APPARATUS FOR VIDEO SIGNAL PROCESSING

[75] Inventor: Akihiko Matsumoto, Kanagawa, Japan

[73] Assignee: Sony Corporation, Tokyo, Japan

[21] Appl. No.: 460,332

[22] Filed: Jun. 2, 1995

[30] Foreign Application Priority Data

Jun. 6, 1994 [JP] Japan .................................. 6-147180

[51] Int. Cl.$^6$ ...................................................... H04H 7/00
[52] U.S. Cl. .......................... 370/527; 370/521; 348/720; 348/722
[58] Field of Search ........................ 364/514 R, 514 A, 364/514 B, 514 C; 348/714, 716, 467, 616, 384, 584, 231, 474, 715, 720, 722; 370/60, 422, 521, 522, 527

[56] References Cited

U.S. PATENT DOCUMENTS

| | | | |
|---|---|---|---|
| 4,593,324 | 6/1986 | Ohkubo et al. | 364/514 R |
| 4,992,781 | 2/1991 | Iwasaki et al. | 348/716 |
| 5,121,205 | 6/1992 | Ng et al. | 348/467 |
| 5,367,341 | 11/1994 | Schnorf | 348/616 |
| 5,465,120 | 11/1995 | Schultheiss | 348/714 |
| 5,479,210 | 12/1995 | Cawley et al. | 348/716 |
| 5,557,538 | 9/1996 | Retter et al. | 364/514 A |
| 5,559,562 | 9/1996 | Ferster | 348/584 |
| 5,568,403 | 10/1996 | Deiss et al. | 364/514 R |
| 5,577,191 | 11/1996 | Bonomi | 348/384 |

*Primary Examiner*—Douglas W. Olms
*Assistant Examiner*—Shick Hom
*Attorney, Agent, or Firm*—Peter C. Toto; Jerry A. Miller

[57] ABSTRACT

A video signal is supplied from a digital VTR 1 and is encoded by an MPEG encoder 8. The encoded video signal is recorded as a compressed video signal in an HDD 9. A plurality of compressed video signals are recorded in the HDD 9 and addresses of the compressed video signals are stored in a controller 6. MPEG decoders 12 and 14 decode the compressed video signals which are read out from the HDD 9. After a video signal processing apparatus 3 executes an editing process on the decoded video signals, a synthesized video signal is supplied to a digital VTR 10 through a switch 7. The synthesized video signal recorded in the digital VTR 10 is supplied to the video signal processing apparatus 3 for further processing through a switch 13 without being decoded. When an end of the editing processes is detected from an input apparatus 5, the synthesized video signal is supplied from the video signal processing apparatus 3 to the HDD 9 through the switch 7 and MPEG encoder 8 and is held as a compressed synthesized video signal.

11 Claims, 6 Drawing Sheets

METHOD AND APPARATUS FOR VIDEO SIGNAL PROCESSING

BACKGROUND OF THE INVENTION

1. Field of the Invention

The present invention relates to a video signal processing apparatus including an editing apparatus which can accumulate and reproduce encoded video data of, for example, an MPEG2 (Moving Picture image coding Experts Group phase 2) format. Further, by providing appropriate switches in a video signal input section and a video signal output section, unnecessary encoding and decoding is avoided and image deterioration is limited.

2. Description of the Related Art

As disclosed in JP-A-59-207788, the applicant of the present invention has proposed a switcher for editing video signals to produce one edited program by switching a plurality of video signals. According to that switcher, by adding a simple mark signal generating apparatus constituting a digital circuit, various effects, which are inserted into editing points of a video tape, are recognized and enabled without using an expensive special effect generating apparatus. Thus, the cost of the editing apparatus can be reduced.

The proposed switcher for editing video signals will be first described with reference to a conventional switcher of the type shown in FIG. 1. At the outset, it is desired to synthesize video signals W, X, Y and Z by the system shown in FIG. 1 to form a synthesized video signal WXYZ. In this case, among the VTRs (Video Tape Recorders) 51 to 54 connected to a switcher 56, the video signal W from the VTR 51 and the video signal X from the VTR 52 are first selected by the switcher 56 and supplied to a video effects apparatus 57.

The video effects apparatus 57 forms a synthesized video signal WX from the video signals W and X and supplies video signal WX to a target VTR 55 for recording. A user is enabled to monitor this process via monitor 58. Next, the video signal Y from the VTR 53 and the synthesized video signal WX from the target VTR 55 are selected by the switcher 56 and the selected video signal Y and synthesized video signal WX are supplied to the video effects apparatus 57. A synthesized video signal WXY is thereby formed by the video effects apparatus 57 and supplied to the target VTR 55 for recording.

Further, the video signal Z from the VTR 54 and the synthesized video signal WXY from the target VTR 55 are selected by the switcher 56 and the selected video signal Z and synthesized video signal WXY are supplied to the video effects apparatus 57. The video effects apparatus 57, to which the signals are supplied, forms the synthesized signal WXYZ and supplies the same to the target VTR 55 for recording.

Although the number of VTRs which supply video signals has been set to four in the conventional apparatus, it is often desired to form a synthesized video signal from the video signals of five or more VTRs. However, in such cases, magnetic tapes are typically replaced since in a VTR, it takes a relatively long time for the VTR heads to search the video signals. Also, when a preview function is performed repeatedly, there is a problem in that the efficiency deteriorates. Since the recording and reproduction are executed many times, there is a problem in that the picture quality of the formed synthesized video signal deteriorates. Finally, in the case of encoded video data, such data must be decoded before mixing thereby resulting in excessive coding and decoding and a deterioration in picture quality. Accordingly, an improved video signal processing apparatus is desired.

OBJECTS AND SUMMARY OF THE INVENTION

It is, therefore, an object of the invention to provide a video signal processing apparatus in which a synthesized video signal can be easily formed irrespective of the number of video signals. Further, in the case of forming a synthesized video signal from a plurality of video signals encoded by, for example, an MPEG2 format, a minimum number of decoding and/or encoding operations need be performed, thereby minimizing deterioration in picture quality.

According to the present invention there is provided a video signal processing apparatus comprising: a memory apparatus which can be accessed at random and which stores video data; a first data path including an encoder for compressing video data and for storing compressed video data to the memory apparatus; a second data path for recording video data to the memory apparatus bypassing the encoder; first switching means for switching video data to the first data path or the second data path; and a decoder for decoding video data reproduced from memory, wherein a second switching means switches reproduced video data to a third data path for decoding if the reproduced video data is compressed and to a fourth data path, which bypasses the decoder, if the video data is uncompressed, e.g., a synthesized video signal. The first switching means can be further adapted to switch synthesized video data to said second data path and a video signal (an uncompressed, unsynthesized video signal) to said first data path.

As one of the compressing methods, video data to be edited is read out from an HDD (Hard Disk Drive), on which a plurality of encoded video data signals have been previously recorded, the read-out video data is decoded and, then the editing process is performed. The edited video data (also may be termed synthesized video data) is recorded in the HDD without being encoded. In the case where another editing process is further performed on the edited video data, the process is executed on the edited video data without the need for decoding. When the editing process of the video data is complete, the edited video data is encoded and recorded in the HDD. When the video data is needed, it is read-out and decoded (optionally) so it can be utilized.

The above and other objects and features of the present invention will become apparent from the following detailed description and the appended claims-with reference to the accompanying drawings.

DETAILED DESCRIPTION OF THE PREFERRED EMBODIMENT

Figure 1:
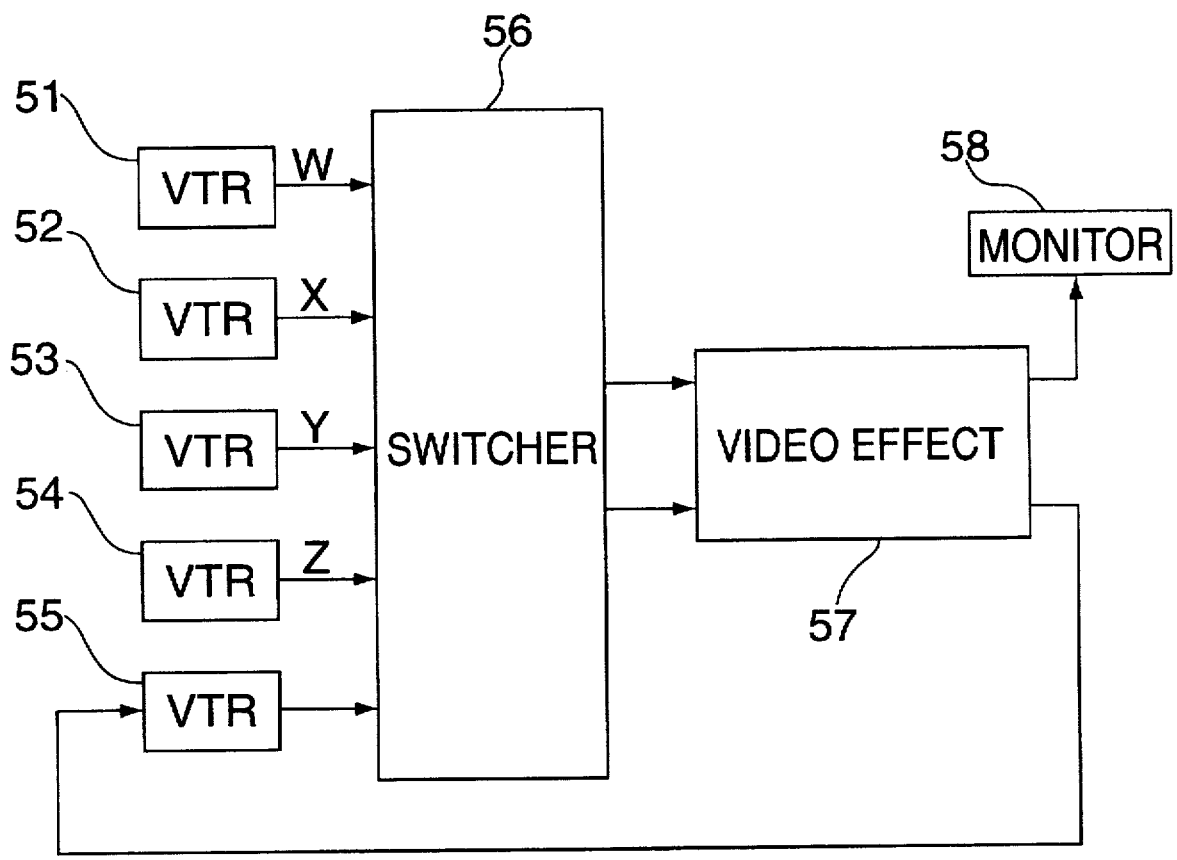
FIG. 1 is a block diagram of a conventional video signal editing system.
Figure 2:
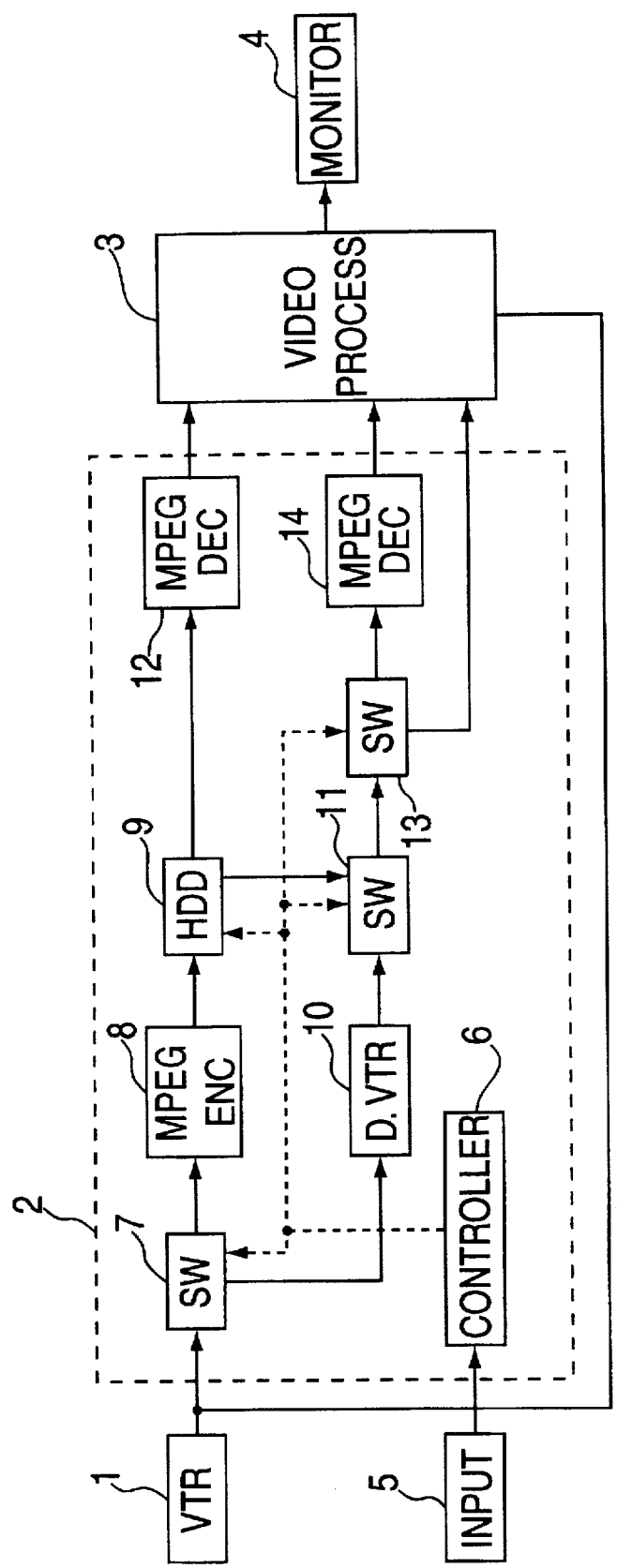
FIG. 2 is a block diagram showing an embodiment of a video signal processing apparatus according to the invention.

An embodiment of a video signal processing apparatus according to the invention will now be described hereinbelow with reference to the drawings. FIG. 2 is a block diagram of an example of the video signal processing apparatus of the invention. A video signal is supplied from a digital VTR 1 to a video image accumulating and reproducing apparatus 2. Digital VTR 1 can represent a plurality of VTRs each for supplying a separate video signal in parallel or a single VTR for successively supplying signals to be edited. In general terms, in the video image accumulating and reproducing apparatus 2, a video signal to be edited is selected from a plurality of supplied video signals in response to an instruction from an input apparatus 5. The selected video signal is supplied to a video signal processing apparatus 3. The video signal processing apparatus 3 executes editing processes such as wipe, fade in/out, and the like with the use of monitor 4. The edited video signal, namely, the synthesized video signal is again supplied to the video image accumulating and reproducing apparatus 2. Such operations are repeated until an end instruction is inputted from the input apparatus 5.

An internal block diagram of the video image accumulating and reproducing apparatus 2 will now be described. A video signal (or a plurality of video signals) supplied from the digital VTR 1 is sent to a switch 7. The switch 7 is controlled by a controller 6 and is switched either to transmit the supplied video signal to an MPEG encoder 8 or to transmit it to a digital VTR 10. Since it is difficult to edit a video signal of a compressed format, the editing process is executed on an uncompressed (standard digital) format video signal. The output of the video signal processing apparatus 3 is, therefore, an edited (synthesized), uncompressed format video signal. The digital VTR 10 is provided in order to store and hold such a synthesized output video signal.

As noted above, when a video signal is supplied from the digital VTR 1 to the switch 7, the switch 7 is switched under the control of the controller 6 so as to supply the video signal to the MPEG encoder 8. In this instance, the MPEG encoder 8 compresses the supplied video signal by using an MPEG2 format. On the other hand, when a synthesized video signal is supplied from the video signal processing apparatus 3 to the switch 7, the switch 7 is switched by the control of the controller 6 so as to supply the synthesized video signal to the digital VTR 10 and the signal is recorded.

The compressed video signals are supplied from the MPEG encoder 8 to an HDD 9. A plurality of compressed video signals are recorded in the HDD 9 under the control of the controller 6. Addresses of the compressed video signals are stored under the control of the controller 6.

Two compressed video signals to be edited are selectively read out from the HDD 9. It is sufficient to use a buffer memory in order to output the two compressed video signals in parallel. One of the compressed video signals is supplied to a switch 11 and the other compressed video signal is supplied to an MPEG decoder 12.

At the same time, the reproduced synthesized video signal (if one has been previously generated) can be supplied from the digital VTR 10 to the switch 11. Either one of the supplied synthesized video signal or the compressed video signal from the HDD 9 can be sent from the switch 11 to a switch 13 by the control of controller 6.

The switch 13 is switched under the control of the controller 6 depending upon whether it is receiving the compressed video signal or the synthesized video signal. In the case where the compressed video signal supplied from the HDD 9 is supplied to the switch 13 through the switch 11, the switch 13 is switched to send the compressed video signal to an MPEG decoder 14. In the case where the synthesized video signal supplied from the digital VTR 10 is supplied to the switch 13 through the switch 11, the switch 13 is switched to send the synthesized video signal directly to the video signal processing apparatus 3, bypassing decoder 14. That is, when the synthesized video signal is supplied to the switch 13, the signal is not supplied to the MPEG decoder 14, but is supplied to the video signal processing apparatus 3.

In the case where the compressed video signal supplied from the HDD 9 is supplied to switch 13 via switch 11, the supplied, compressed video signals are decoded by the MPEG decoders 12 and 14 and the decoded video signals are supplied as a digitized video signal to the video signal processing apparatus 3. As noted above, in the case where the synthesized video signal supplied from the digital VTR 10 is supplied to the switch 13, only the compressed video signal supplied to MPEG decoder 12 is decoded. The synthesized video signal is sent directly to the processing apparatus 3.

The video signal processing apparatus 3 executes editing processes such as fade-in, fade-out, wipe, and the like on the video signals supplied thereto, i.e., the uncompressed video signals including the synthesized video signals. When an end operation is instructed from the input apparatus 5 to the controller 6, the synthesized video signal, which is supplied from the video signal processing apparatus 3 to the switch 7, is sent to the MPEG encoder 8, through the switch 7, for coding. Importantly, until the end instruction is given, the synthesized video signal from the video signal processing apparatus 3 is supplied to the digital VTR 10.

In other words, when all of the editing processes are finished, the encoding of the synthesized video is performed, preferably by using MPEG2. The compressed synthesized video signal is then supplied to the HDD 9 and is recorded. Although the HDD has been used to store the compressed video signal in the embodiment, any other memory devices such as MO (Magneto-optic disc), semiconductor memory, or the like can be also used as long as it can be accessed at random and can intermittently transmit data to the MPEG decoders 12 and 14.

Figure 3:
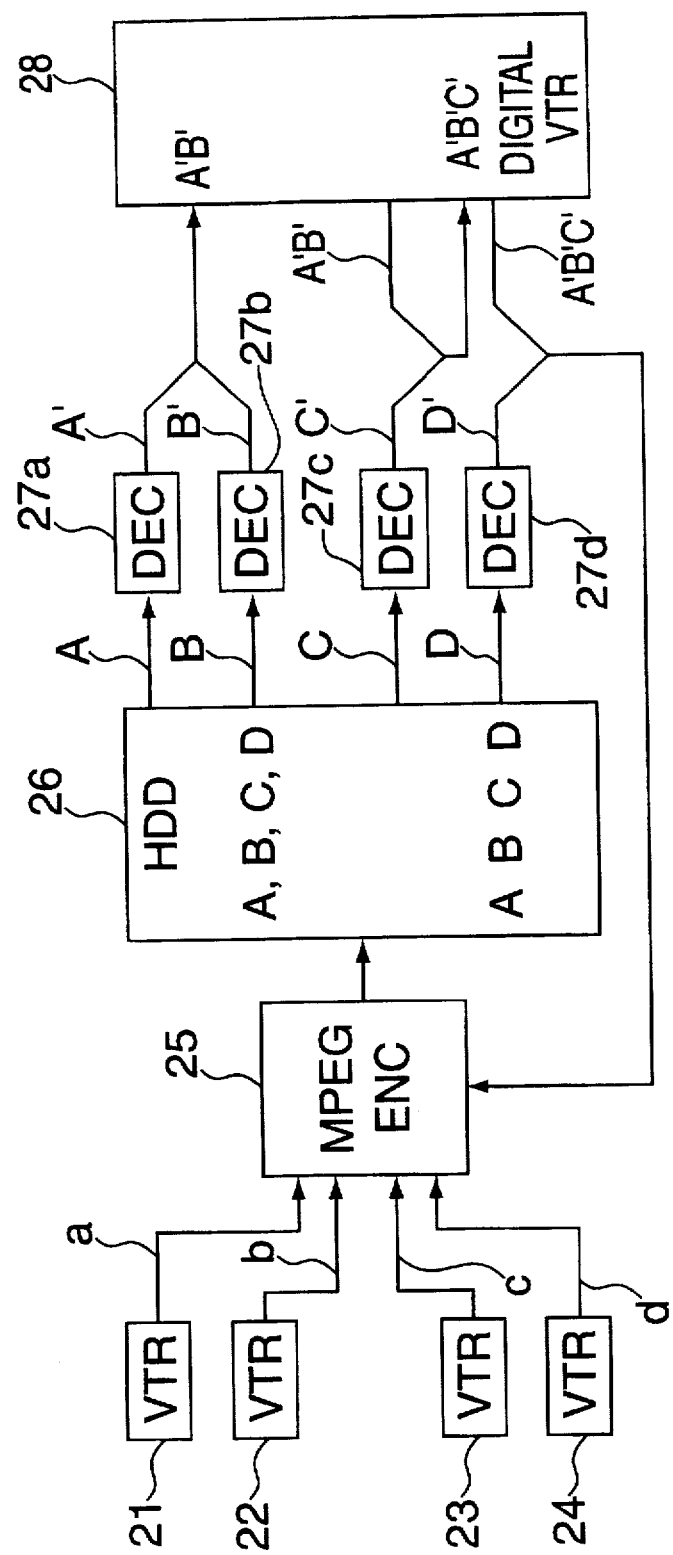
FIG. 3 is a schematic diagram for explaining the operation of the video signal processing apparatus according to the invention.

FIG. 3 is a schematic block diagram illustrating the operating principles of an exemplary video image accumulating and reproducing apparatus 2 wherein a compressed, synthesized video signal (ABCD) is formed from a plurality of video signals. A video signal (a) from a VTR 21, a video signal (b) from a VTR 22, a video signal ©  from a VTR 23, and a video signal (d) from a VTR 24 are supplied to an MPEG encoder 25 and are encoded into data of an MPEG2 format. The MPEG encoded video signal (a) is written as a file (A) to an HDD 26. Similarly, files (B), (C), and (D) are also written to the HDD 26 representative of video signals (b)–(d), respectively.

Processing continues by selecting files (A) and (B), for example, from the HDD 26. A and B are supplied to MPEG decoders 27a and 27b, respectively, and are decoded. Decoded video signals A' and B' are synthesized (summed) and a synthesized video signal A'B' is written to a digital VTR 28. The file © is subsequently selected from the HDD 26 and is decoded by an MPEG decoder 27c. A decoded video signal C' is synthesized with the synthesized video signal A'B' selected from the digital VTR 28. A synthesized video signal A'B'C' is similarly supplied to the digital VTR 28 and is recorded.

Further, the file (D) is selected from the HDD 26 and is supplied to an MPEG decoder 27d. The file (D) supplied to the MPEG decoder 27d is decoded as a decoded video signal D' and is synthesized with the synthesized video signal A'B'C' selected from the digital VTR 28. The synthesized video signal A'B'C'D' is supplied to the MPEG encoder 25, is MPEG encoded and is recorded as a file ABGD in the HDD 26.

As mentioned above, since minimal encoding and decoding has been performed to produce the encoded data, a deterioration of a video image which occurs due to the encoding and decoding can be limited. Although, in the above example, the decoded, synthesized video signal has been recorded in the digital VTR 28, it can also be recorded in the HDD 26 in which the encoded video signals (A,B,C, D) have been recorded, or on an HDD which is different from the HDD 26 in which the encoded video signals have been recorded can be employed.

Figure 4:
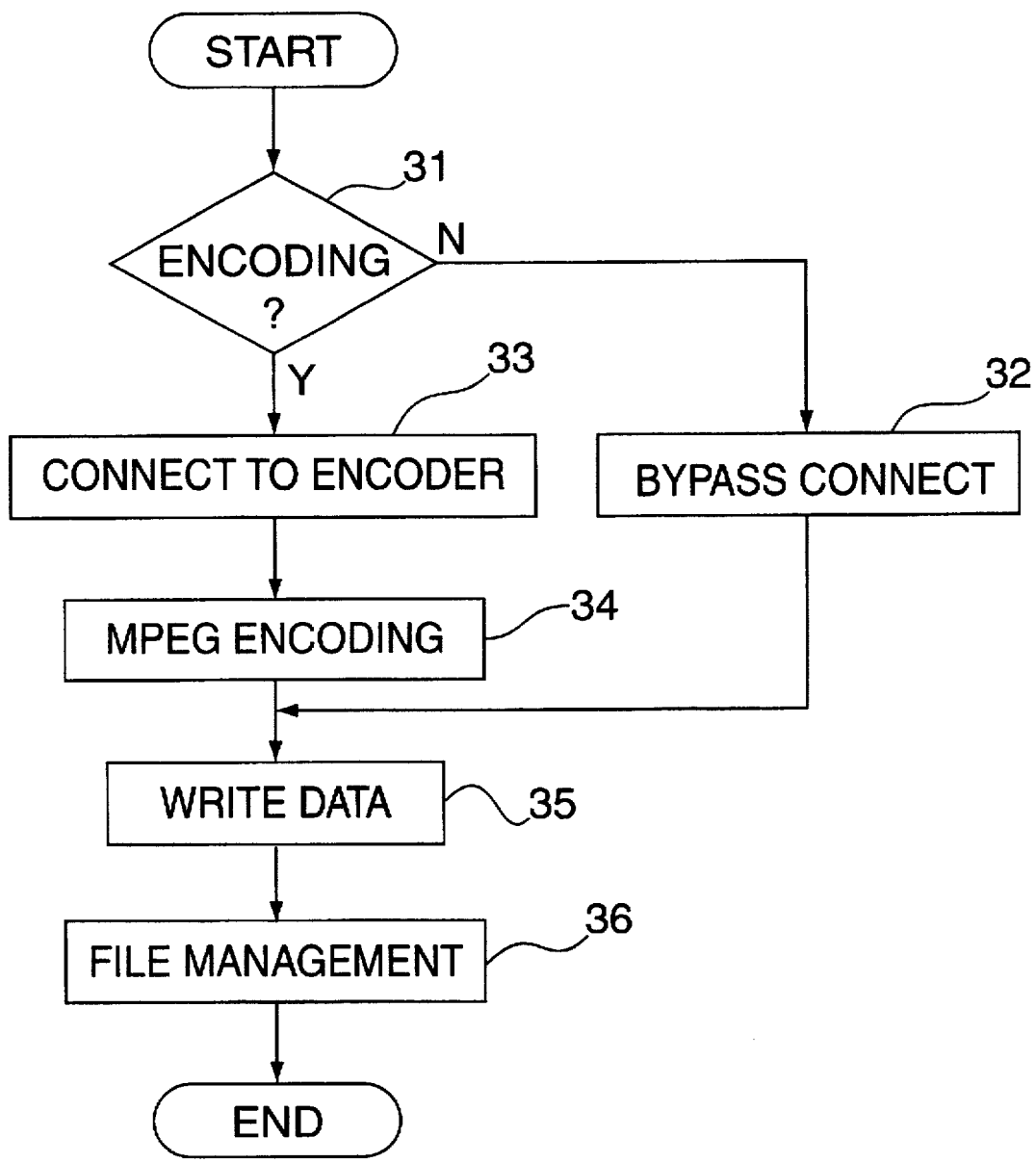
FIG. 4 is a flowchart showing an example of a switching operation in a video signal input section according to the invention.

FIG. 4 is a flowchart showing an example of a control routine for inputting. video data in accord with the present invention. The video signals, e.g., a–d from FIG. 3, and the synthesized video signal (hereinafter, referred to as video data) are supplied and the processing routine advances to step 31 where a check is made to see if MPEG encoding is to be executed on the inputted video data or not, namely, whether the inputted video data is the video signal or the synthesized video signal. When it is judged that the MPEG encoding is to be executed, namely, when the inputted video data is judged as a video signal, step 33 follows wherein the video data is switched so as to connect the encoder and step 34 follows. In an MPEG encoding step 34, to compress the inputted video signal encoding by an MPEG2 format is executed and step 35 follows.

On the other hand, when it is judged in step 31 that the MPEG encoding is not to be executed, namely, when the inputted video data is determined to be a synthesized video signal, the processing routine advances to step 32, a bypass connection step. In step 32, the video data bypasses the encoder and step 35 follows.

In step 35, the MPEG encoded (compressed) video signal is written to an HDD and the synthesized video signal which is not MPEG encoded (has bypassed the MPEG encoder) is written to a digital VTR. In a file management step 36, a controller stores at least an address of the compressed video signal written in the HDD in step 35 and maintains it as a file. The input processing routine is thereby finished.

Figure 5:
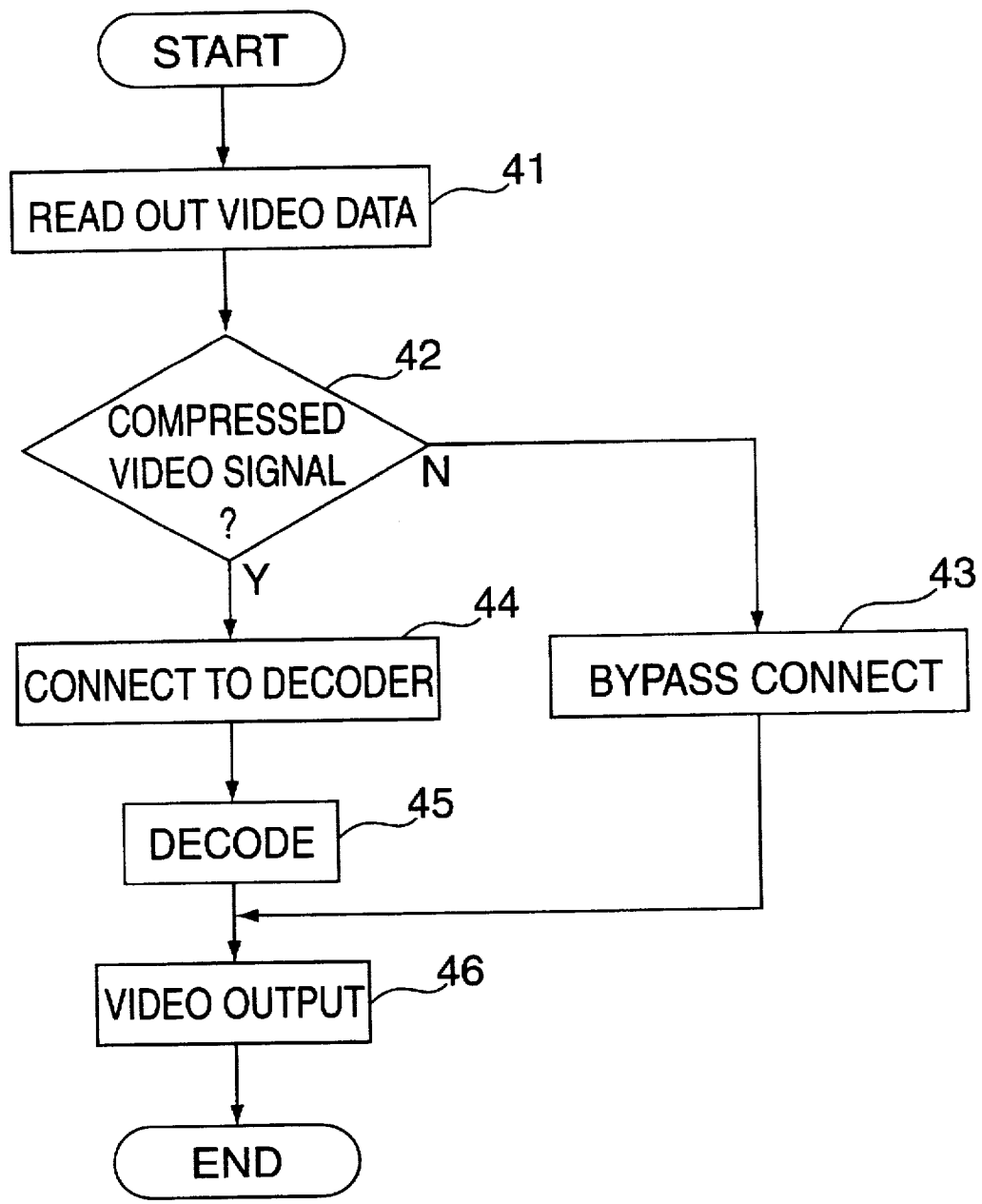
FIG. 5 is a flowchart showing an example of a switching operation in a video signal output section according to the invention.

FIG. 5 is a flowchart showing an example of a control routine for reading-out video data in accord with the present invention. In a video data reading step 41, the video data is read out from the HDD or the digital VTR. In step 42, a check is made to see whether the video data read out in step 41(compressed video signal reading) is a compressed video signal or a synthesized video signal. When the read video data is determined to be the compressed video signal in step 42, step 44 follows.

In step 44, the compressed video signal is connected to a decoder. In a decoding in step 45, the read, compressed video signal is decoded. The processing routine advances to a video output in step 46 wherein the video image of the decoded video signal is output to an output apparatus such as a monitor or the like and the processing routine is finished.

On the other hand, in the case where the video data is judged as a synthesized video signal in step 42, step 43 follows. In step 43, the synthesized video signal bypasses the decoding step 45. Step 46 (video output) follows and the video image is outputted and the processing routine is finished.

Figure 6:
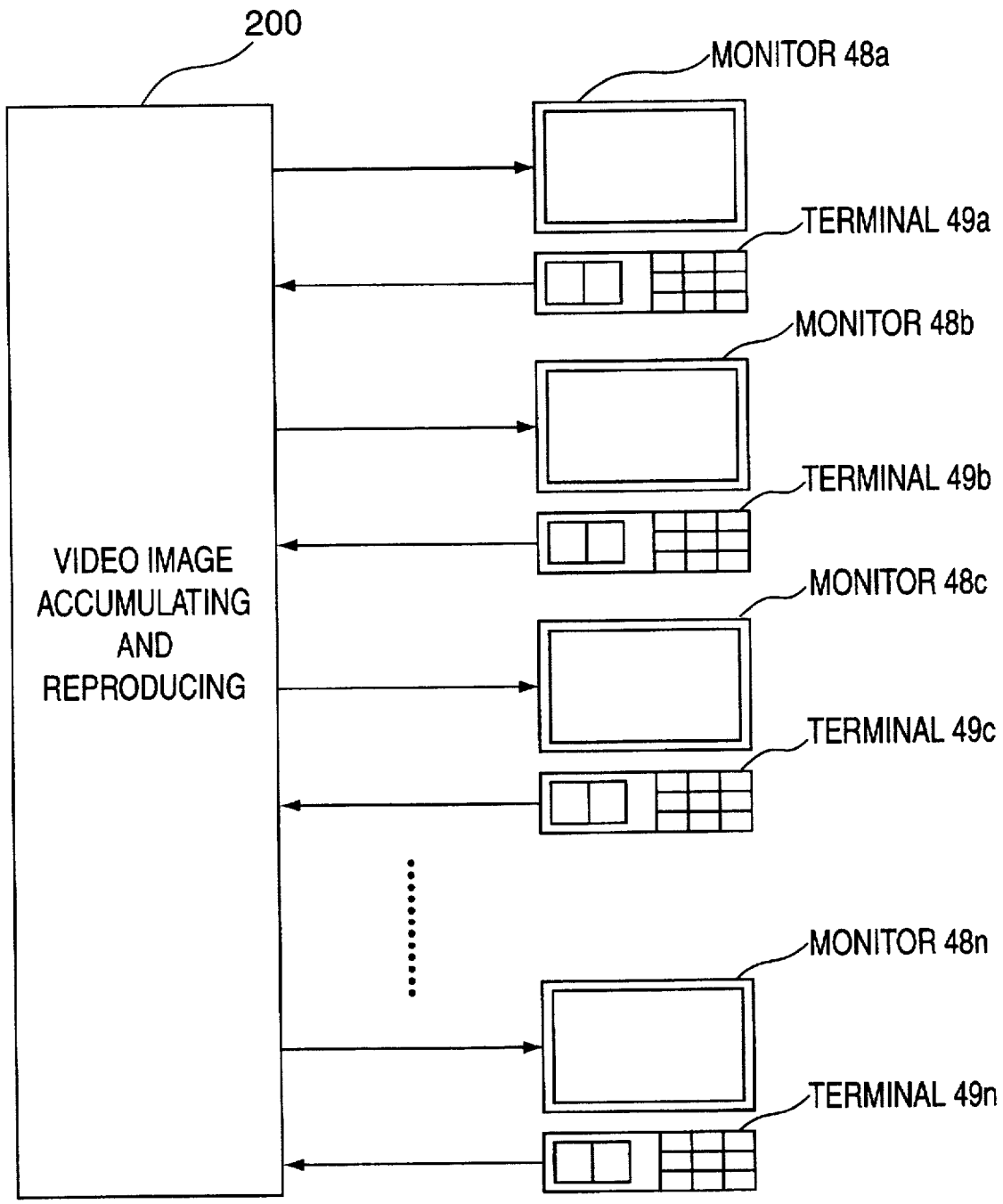
FIG. 6 is a block diagram showing an embodiment of the video signal processing apparatus according to the invention.

FIG. 6 is a schematic block diagram of an embodiment for utilizing the edited video signals. In this embodiment, (N) monitors 48a–48N and (N) terminals 49a–49N corresponding to such monitors 48 are connected to the video image accumulating and reproducing apparatus 200. That is, input/output terminals of (N) channels are provided for the video image accumulating and reproducing apparatus 200. The video image accumulating and reproducing apparatus 200 executes MPEG encoding for compression of the edited video signal as described above and records the same. A plurality of compressed video signals are recorded in the video image accumulating and reproducing apparatus 200. A selection signal is supplied from a terminal 49a to the video image accumulating and reproducing apparatus 200 in order to utilize one of the plurality of recorded compressed video signals.

The video image accumulating and reproducing apparatus 200 outputs the compressed video signal to a monitor 48a corresponding to the terminal from which the selection signal was supplied. After the supplied, compressed video signal is decoded, the video signal is outputted to a display of the monitor 48a. Similarly, a selection signal is supplied from a terminal 49b, the compressed video signal is sent to a monitor 48b and is decoded, and after that, the video signal is displayed. In this instance, the number of channels is determined so that the compressed video signals can be intermittently supplied to all of the monitors even if selection signals are simultaneously supplied from all of the terminals to the video image accumulating and reproducing apparatus 200. Further, other storage means can be properly selected so long as it outputs the compressed video signal in an encoded state such as case where the compressed video signal is outputted from the HDD 9 included in the video image accumulating and reproducing apparatus 2 of FIG. 2, through the switch 13, or the like.

As a result of the video signal processing apparatus according to the invention, in the case of editing video signals encoded by, for example, the MPEG2 format, since it is sufficient to execute minimal decoding and/or encoding, a deterioration in picture quality which occurs due to the decoding and encoding can be minimized.

The present invention is not limited to the foregoing embodiment but many modifications and variations are possible within the spirit and scope of the appended claims of the invention.

What is claimed is:

1. A method for processing video signals comprising the steps of:

providing a plurality of video signals;

encoding each of said plurality of video signals thereby producing a plurality of encoded video signals;

storing said plurality of encoded video signals in memory means at respective locations;

recalling at least two of said plurality of encoded video signals stored in said memory means thereby providing first recalled video signals;

decoding said first recalled video signals thereby providing first decoded video signals;

editing said first decoded video signals thereby providing a first edited video signal;

storing said first edited video signal in said memory means, said first edited video signal being unencoded;

recalling at least one of said plurality of encoded video signals stored in said memory means thereby providing a second recalled video signal;

decoding said second recalled video signal thereby providing a second decoded video signal;

recalling said first edited video signal from said memory means;

editing said first edited video signal and said second decoded video signal thereby providing a second edited video signal;

receiving an instruction indicative of an end of editing operation;

encoding said second edited video signal in response to said instruction thereby providing an encoded edited video signal; and storing said encoded edited video signal in said memory means.

2. The method for processing video signals according to claim 1 wherein the steps of encoding and decoding comprise Moving Picture image coding Experts Group phase 2 MPEG2 encoding and decoding.

3. The method for processing video signals according to claim 1 wherein said memory means includes a hard disc drive for storing at least said plurality of encoded video signals and a digital video tape recorder for storing at least said first and second combined video signals.

4. A video signal processing apparatus comprising:

a memory apparatus which can be accessed at random and which stores video data;

a first data path including encoding means for encoding said video data to produce encoded video data and for recording said encoded video data into said memory apparatus;

a second data path for recording said video data into said memory apparatus bypassing said encoding means;

first switching means for switching said video data to said first data path or said second data path, said first data path being selected only for either unedited video data or in response to an end of edit instruction;

decoding means for decoding said encoded video data recalled from said memory apparatus;

second switching means for switching recalled video data to a third data path for decoding by said decoding means if said video data is encoded or to a fourth data path which bypasses said decoding means if said video data is not encoded; and editing means for editing said video data to provide edited video data.

5. The apparatus according to claim 4, wherein Moving Picture image coding Experts Group phase 2 MPEG2 is used as an encoding format for compressing said video data.

6. A video signal processing apparatus comprising:

a memory apparatus which can be accessed at random and which stores video data;

a first data path including encoding means for encoding said video data to produce encoded video data and for recording said encoded video data into said memory apparatus;

a second data path for recording said video data into said memory apparatus bypassing said encoding means, thereby providing unencoded video data;

first switching means for switching said video data to said first data path or said second data path, said first data path being selected only for either unedited video data or in response to an end of edit instruction;

decoding means for decoding said encoded video data reproduced from said memory apparatus, thereby producing decoded video data;

second switching means for switching reproduced video data to a third data path for decoding by said decoding means if said video data is encoded or to a fourth data path which bypasses said decoding means if said video data is unencoded; and means for editing unencoded and decoded video data, thereby producing edited video data.

wherein said encoding means encodes said edited video data via said first data path to produce transmittable video data ,said transmittable video data being stored into said memory apparatus and said transmittable video data being reproduced from said memory apparatus in accordance with a user's request.

7. The apparatus according to claim 6, wherein Moving Picture image coding Experts Group phase 2 MPEG2 is used as an encoding format for compressing the video data.

8. A video signal processing apparatus comprising:

a memory apparatus which can be accessed at random and which stores video data;

a first data path including encoding means for encoding said video data to produce encoded video data and for recording said encoded video data into said memory apparatus;

a second data path for recording said video data into said memory apparatus without passing through said encoding means, thereby providing unencoded video data;

first switching means for switching said first data path and said second data path, said first data path being selected only for either unedited video data or in response to an end of edit instruction;

means for simultaneously outputting at least two video data recorded in said memory apparatus and decoding said video data, thereby providing decoded video data;

second switching means for switching a third data path for decoding said video data through said decoding means and a fourth data path which bypasses said decoding means, said second switching means being provided at a front stage of said decoding means; and editing means for editing said two video data thereby producing edited video data.

9. The apparatus according to claim 8 wherein Moving Picture image coding Experts Group phase 2 MPEG2 is used as an encoding format for compressing the video data.

10. A video signal processing apparatus comprising:

a memory apparatus which can be accessed at random and which stores video data;

a first data path including encoding means for encoding said video data to produce encoded video data and for recording said encoded video data into said memory apparatus;

a second data path for recording said video data into said memory apparatus without passing through said encoding means;

first switching means for switching said first data path and said second data path, said first data path being selected only for either unedited video data or in response to an end of edit instruction;

means for simultaneously outputting at least two video data recorded in said memory apparatus and decoding said video data, thereby providing decoded video data;

second switching means for switching a third data path for decoding said video data through said decoding means and a fourth data path which does not pass through said decoding means, said second switching means being provided at a front stage of said decoding means;

means for editing said decoded video data, thereby producing edited video data; and, means for reading out at least one of said edited video data and at least one of said encoded video data which are stored in said memory apparatus for next editing.

11. The apparatus according to claim 10 wherein Moving Picture image coding Experts Group phase 2 MPEG2 is used as an encoding format for compressing the video data.

* * * * *